United States Patent
Han et al.

(10) Patent No.: US 10,239,508 B2
(45) Date of Patent: Mar. 26, 2019

(54) BREAK APPARATUS HAVING DETACHABLE PUMP HOUSING

(71) Applicant: MANDO CORPORATION, Gyeonggi-do (KR)

(72) Inventors: Sang-Soo Han, Gyeonggi-do (KR); Youngsong Lee, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 110 days.

(21) Appl. No.: 15/605,955

(22) Filed: May 26, 2017

(65) Prior Publication Data
US 2017/0341632 A1   Nov. 30, 2017

(30) Foreign Application Priority Data

May 26, 2016   (KR) ......................... 10-2016-0064629

(51) Int. Cl.
| | |
|---|---|
| *B60T 8/36* | (2006.01) |
| *B60T 13/14* | (2006.01) |
| *B60T 8/40* | (2006.01) |
| *F04B 9/02* | (2006.01) |
| *F04B 19/22* | (2006.01) |
| *F16H 1/16* | (2006.01) |
| *F16H 19/04* | (2006.01) |
| *B60T 13/66* | (2006.01) |
| *B60T 13/68* | (2006.01) |

(Continued)

(52) U.S. Cl.
CPC ............ *B60T 8/4031* (2013.01); *B60T 8/368* (2013.01); *B60T 8/4022* (2013.01); *B60T 13/142* (2013.01); *B60T 13/662* (2013.01); *B60T 13/686* (2013.01); *B60T 13/745* (2013.01); *F04B 9/02* (2013.01); *F04B 17/03* (2013.01); *F04B 19/22* (2013.01); *F04B 53/22* (2013.01); *F16H 1/16* (2013.01); *F16H 19/04* (2013.01); *B60T 8/4081* (2013.01)

(58) Field of Classification Search
CPC .... B60T 13/142; B60T 13/143; B60T 8/4022; B60T 8/368
See application file for complete search history.

(56) References Cited

U.S. PATENT DOCUMENTS

| | | | |
|---|---|---|---|
| 2015/0061364 A1* | 3/2015 | Murayama | ............ B60T 13/662 303/15 |
| 2017/0182992 A1* | 6/2017 | Matsunaga | ............ B60T 13/142 |

FOREIGN PATENT DOCUMENTS

KR   10-2015-0012340   2/2015

\* cited by examiner

*Primary Examiner* — F Daniel Lopez
*Assistant Examiner* — Daniel S Collins
(74) *Attorney, Agent, or Firm* — Ladas & Parry, LLP (57) ABSTRACT

Provided is a brake apparatus having a detachable pump housing. The brake apparatus having a detachable pump housing includes a master cylinder that receives an operating force of a pedal, a main housing in which the master cylinder is accommodated and a through-hole is formed at one side thereof, a motor that provides a driving force, a pump piston that is accommodated in the main housing, and moves in and out of the main housing through the through-hole by receiving the driving force from the motor, a gear unit that converts the driving force of the motor into a linear motion and transmits the linear motion to the pump piston, and a pump housing in which the pump piston is accommodated and an opening is formed at one side thereof, and that is detachably fastened to the main housing such that the opening communicates with the through-hole.

7 Claims, 7 Drawing Sheets

(51) Int. Cl.
*B60T 13/74* (2006.01)
*F04B 17/03* (2006.01)
*F04B 53/22* (2006.01)

BRAKE APPARATUS HAVING DETACHABLE PUMP HOUSING

CROSS-REFERENCE TO RELATED APPLICATION

This application claims priority to and the benefit of Korean Patent Application No. 10-2016-0064629, filed on May 26, 2016, the disclosure of which is incorporated herein by reference in its entirety.

BACKGROUND

1. Field of the Invention

The present invention relates to a brake apparatus having a detachable pump housing, and more particularly, to a brake apparatus having a detachable pump housing which can easily change a stroke of a pump piston in accordance with a required quantity of liquid required for each size of a vehicle.

2. Discussion of Related Art

In recent years, development of hybrid vehicles, fuel cell vehicles, electric vehicles, and the like has been actively carried out to improve fuel economy and reduce exhaust gas.

In such a vehicle, a brake apparatus, that is, a vehicle brake apparatus is essentially installed. Here, the vehicle brake apparatus refers to an apparatus that functions to reduce or stop the speed of a running vehicle.

A typical vehicle brake apparatus includes a vacuum brake that generates a braking force using a suction pressure of a vehicle engine and a hydraulic brake that generates a braking force using a hydraulic pressure.

The vacuum brake is an apparatus that allows a vacuum booster to exert a large braking force with a small force using a pressure difference between the suction pressure of the vehicle engine and the atmospheric pressure. That is, the vacuum brake generates an output much greater than a force applied to a brake pedal when a driver depresses the brake pedal.

The above-described conventional vacuum brake has a problem that the suction pressure of the vehicle engine must be supplied to the vacuum booster for the purpose of vacuum formation so that the fuel efficiency is reduced. In addition, there is a problem that the engine must be always driven for the purpose of vacuum formation even when the vehicle is stopped.

In addition, in the case of the fuel cell vehicle and the electric vehicle, there is no vehicle engine so that it is impossible to apply an existing vacuum brake that amplifies a pedal operation force of the driver during braking, and in the case of the hybrid vehicle, an idle stop function must be implemented to improve the fuel efficiency when the vehicle is stopped so that introduction of the hydraulic brake is necessary.

That is, as described above, it is necessary to implement regenerative braking in order to improve the fuel efficiency in all the vehicles, so that it is easy to implement the function of the hydraulic brake at the time of introduction of the hydraulic brake.

Meanwhile, in the case of an electrohydraulic brake system, which is a kind of hydraulic brakes, when a driver depresses a pedal, an electronic control unit senses this and supplies a hydraulic pressure to a master cylinder, thereby generating a braking force by transmitting a braking hydraulic pressure to wheel cylinders of respective wheels.

Such an electrohydraulic brake system includes a BAU (brake actuation unit) composed of a master cylinder, a reservoir, a pedal simulator, an input rod assembly, and the like to control the braking hydraulic pressure transmitted to the wheel cylinders, an ABS (anti-lock brake system)/ESC (electronic stability control) that independently controls the braking force of each wheel, and a hydraulic pressure generating unit composed of a motor, a piston pump, a control valve, and the like. Recently, an electronic control brake apparatus has been developed in which the BAU and the hydraulic pressure generation unit are integrated into a single module so as to improve braking stability and vehicle mountability.

However, when the piston pump is arranged in a BAU housing in the conventional integrated type electronic control brake apparatus as described above, since the size of the BAU housing must be increased, a separate large casting or extrusion mold is required and a workload increases.

In addition, when the brake apparatus is applied to a large and heavy vehicle, it is necessary to increase the stroke of the pump piston because a large quantity of liquid is required, so that there is a problem that the size of the entire BAU housing must be made large.

PRIOR ART DOCUMENT

Patent Literature

Korean Patent Laid-open Publication No. 10-2015-0012340

SUMMARY OF THE INVENTION

The present invention is directed to a brake apparatus having a detachable pump housing in which a size of a BAU (brake actuation unit) housing is not required to be increased even when a piston pump is arranged in the BAU housing and a stroke of a pump piston can be easily changed in accordance with a required quantity of liquid required for each size of a vehicle.

According to an aspect of the present invention, there is provided a brake apparatus having a detachable pump housing including: a master cylinder that receives an operating force of a pedal; a main housing in which the master cylinder is accommodated and a through-hole is formed at one side thereof; a motor that provides a driving force; a pump piston that is accommodated in the main housing, and moves in and out of the main housing through the through-hole by receiving the driving force from the motor; a gear unit that converts the driving force of the motor into a linear motion and transmits the linear motion to the pump piston; and a pump housing in which the pump piston is accommodated and an opening is formed at one side thereof, and that is detachably fastened to the main housing such that the opening communicates with the through-hole.

Here, the master cylinder and the pump piston may be arranged in parallel with each other inside the main housing.

Also, the motor may be arranged outside the main housing, and a rotation shaft of the motor and the pump piston may be arranged perpendicular to each other.

Also, the gear unit may include a worm shaft that is coaxially connected to a rotation shaft of the motor, a worm wheel that is engaged with the worm shaft so as to intersect at a right angle with the worm shaft, a pinion gear that is coaxially connected to the worm wheel, and a rack gear that causes the pump piston connected to an end of the pinion gear to linearly move while linearly moving left and right along a rotation direction of the pinion gear in engagement with the pinion gear.

Also, the pump housing may include an extension portion that protrudes to be inserted into the through-hole of the main housing at the opening, and a gasket for sealing that is provided between an inner surface of the through-hole and an outer surface of the extension portion.

Also, the pump housing may define a flange extending outwardly at the opening, and the flange may be fastened to the main housing using a bolt.

Also, a plurality of pump pistons may be formed, a plurality of through-holes may be formed in the main housing to allow each of the pump pistons to move in and out of the main housing, and a plurality of pump housings may be provided to be respectively fastened to the plurality of through-holes.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail with reference to the accompanying drawings, in which like reference numerals refer to like or similar elements regardless of figure numbers and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are only for easily understanding the spirit of the present invention and it should not be interpreted that the spirit of the present invention is limited by the accompanying drawings.

Figure 1:
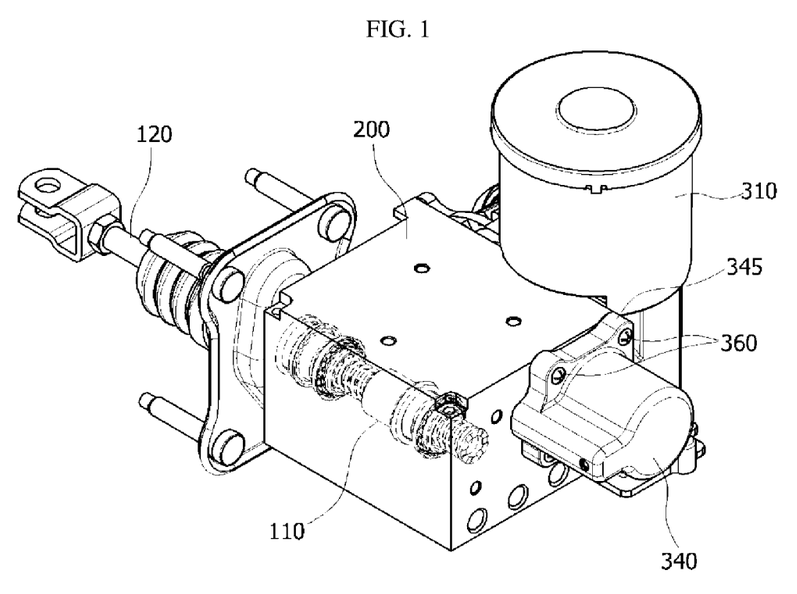
FIG. 1 is a perspective view showing a brake apparatus having a detachable pump housing according to an embodiment of the present invention.
Figure 2:
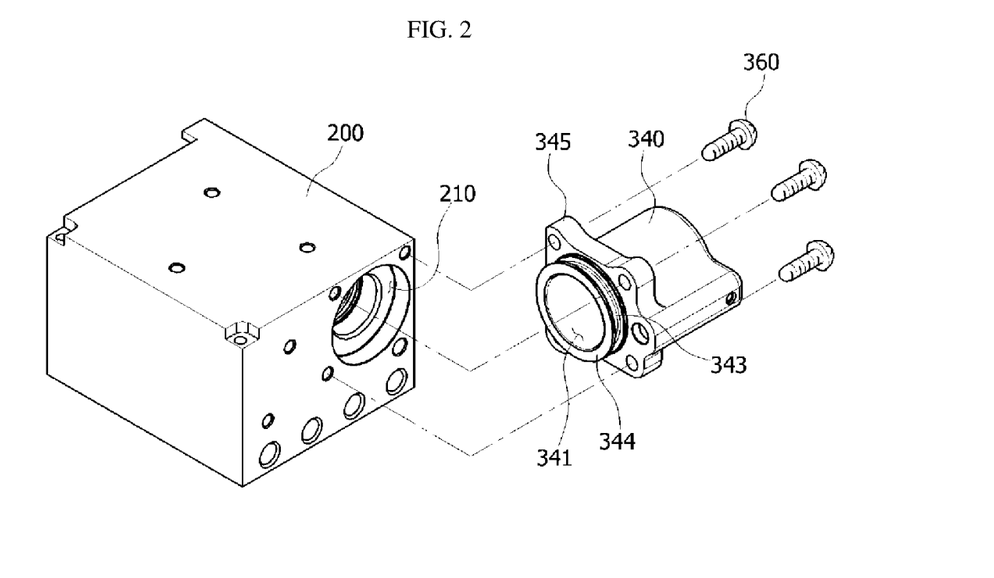
FIG. 2 is a perspective view showing a state in which a pump housing is detached from a brake apparatus having a detachable pump housing according to an embodiment of the present invention.
Figure 3:
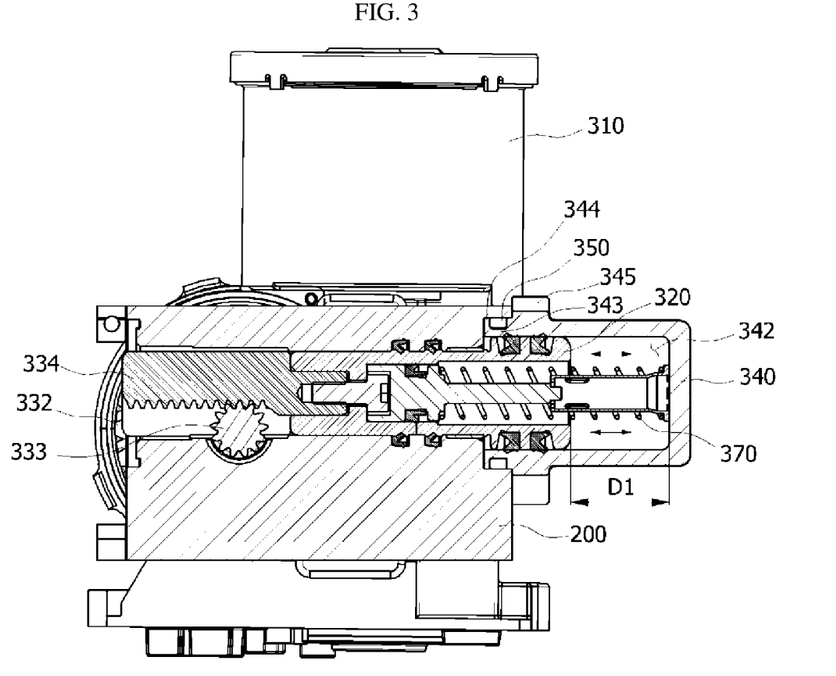
FIG. 3 is a cross-sectional view showing a brake apparatus having a detachable pump housing according to an embodiment of the present invention.

FIG. 1 is a perspective view showing a brake apparatus having a detachable pump housing according to an embodiment of the present invention, FIG. 2 is a perspective view showing a state in which a pump housing is detached from a brake apparatus having a detachable pump housing according to an embodiment of the present invention, and FIG. 3 is a cross-sectional view showing a brake apparatus having a detachable pump housing according to an embodiment of the present invention.

Referring to FIGS. 1 to 3, the brake apparatus having a detachable pump housing according to an embodiment of the present invention includes a master cylinder 110, a main housing 200, a motor 310, a pump piston 320, a gear unit 330, and a pump housing 340.

First, the main housing 200 refers to a BAU (brake actuation unit) housing, and inside the main housing 200, a BAU including the master cylinder 110, and a hydraulic pressure generating unit 300 including the motor 310, the pump piston 320, the gear unit 330, and the pump housing 340 are accommodated.

The BAU includes the master cylinder 110 that receives an operating force of a brake pedal and a pedal simulator that generates a reaction force due to a displacement of the brake pedal to provide a driver with a proper pedal feeling.

The main housing 200 in which the master cylinder 110 and the pedal simulator are accommodated in this manner may be fixed on a vehicle body panel in an engine room through a mounting bracket.

Meanwhile, the master cylinder 110 may include two pistons provided therein so as to have two hydraulic circuits for supplying a hydraulic pressure to wheel cylinders.

A reservoir in which brake oil supplied to the master cylinder 110 is stored is coupled to an upper portion of the master cylinder 110.

In addition, an input rod 120 that connects the brake pedal and the master cylinder 110 and transmits the operating force of the brake pedal to the master cylinder 110 is provided at one side of the master cylinder 110.

The input rod 120 is disposed coaxially with the master cylinder 110 so as to be advanced by the operating force applied to the brake pedal, and is coupled to a rear side piston inside the master cylinder 110 at a constant spacing.

Therefore, when the operating force is applied to the brake pedal, the operating force may be transmitted to the piston inside the master cylinder 110 through the input rod 120 disposed coaxially with the piston.

According to the present invention, the main housing 200 forms a through-hole 210 at one side thereof. The through-hole 210 is for the entry and exiting of the pump piston 320, and a detailed description related thereto will be given later.

Figure 7:
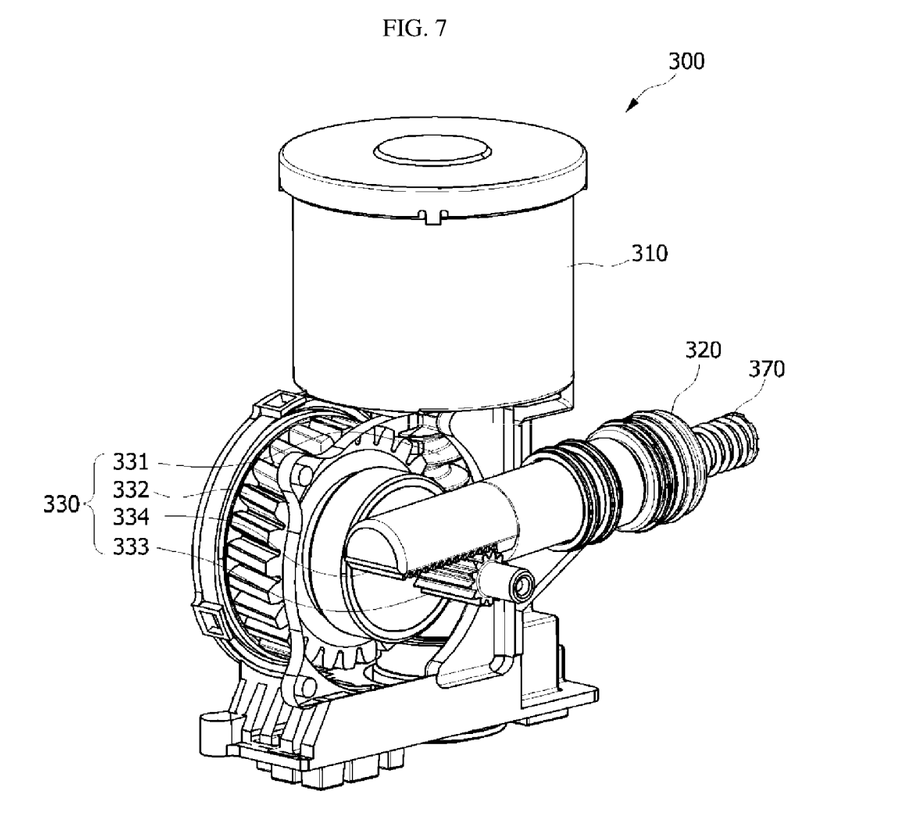
FIG. 7 is a perspective view showing a hydraulic pressure generating unit extracted from a brake apparatus having a detachable pump housing according to an embodiment of the present invention.

FIG. 7 is a perspective view showing a hydraulic pressure generating unit extracted from a brake apparatus having a detachable pump housing according to an embodiment of the present invention.

Referring to FIG. 7, the hydraulic pressure generating unit 300 is for generating a hydraulic pressure required for braking by a motor operated in accordance with a pedal operation amount of a driver. The hydraulic pressure generating unit 300 includes the motor 310 that supplies a rotational force, the pump piston 320 that receives a driving force from the motor 310 to move in and out of the main housing 200 through the through-hole 210, and the gear unit 330 that converts the rotational force of the motor 310 into a linear motion and transmits the linear motion to the pump piston 320.

The motor 310 provides a driving force, i.e., a rotational force, and as the motor 310, a BLAC (blushless AC) motor which is a three-phase alternating-current motor known to have a long life and high efficiency may be typically used.

A three-phase connector for connecting an inner three-phase coil to a ground coil may be provided at a rear end of the motor 310, and a position sensor magnet that can detect a position of a rotor of the motor 310 may be installed at an end of a rotation shaft of the motor 310. The position sensor magnet may implement functions of an encoder and a hole sensor which detect the position of the rotor together with a digital signal processing chip.

The motor 310 is physically connected to the pump piston 320 through the gear unit 330 and electrically connected to an ECU (electronic control unit).

The pump piston 320 receives the driving force from the motor 310 and moves linearly while moving in and out of the main housing 200 through the through-hole 210.

The pump housing 340 defines a receiving space 342 therein to receive the pump piston 320 and has an opening 341 for opening the receiving space 342 to the outside at one side thereof, so that the pump housing 340 has a shape of a container as a whole.

The pump housing 340 is detachably fastened to the main housing 200 such that the opening 341 communicates with the through-hole 210.

Accordingly, the pump piston 320 moves linearly within the pump housing 340, and the pump piston 320 and the pump housing 340 may serve as a piston pump.

Therefore, when the pump piston 320 is driven by the motor 310, a pumping operation may be performed inside the pump housing 340 by the pump piston 320 and the pump housing 340.

At this time, a spring 370 that provides an elastic reaction force while supporting the pump piston 320 may be provided inside the pump housing 340.

When the above-described pumping operation is performed, oil may be sucked from the reservoir and discharged to an accumulator, and high-pressure oil stored in the accumulator may be discharged to the master cylinder 110 or a hydraulic brake.

Generally, a relatively small quantity of liquid is required for braking in small and light vehicles. Therefore, a stroke of the pump piston 320 may also be reduced in proportion to the required quantity of liquid.

On the other hand, a large quantity of liquid is required for braking in large and heavy vehicles. For this purpose, the stroke of the pump piston 320 must be increased in proportion to the required quantity of liquid.

Conventionally, when a change in the stroke of the pump piston 320 is required, the entire size of the main housing 200 has to be changed to match the stroke of the pump piston 320. In particular, in the case of a large and heavy vehicle, when a large quantity of liquid is required for braking, the entire size of the main housing 200 has to be increased to increase the stroke of the pump piston 320.

In this case, a large casting or extrusion mold is required for manufacturing the main housing 200 of a large size, thereby increasing the workload and increasing the manufacturing costs.

However, according to the present invention, the stroke of the pump piston 320 may be changed by changing only the size of the pump housing 340 detachably fastened to the main housing 200 without changing the size of the main housing 200.

Figure 4:
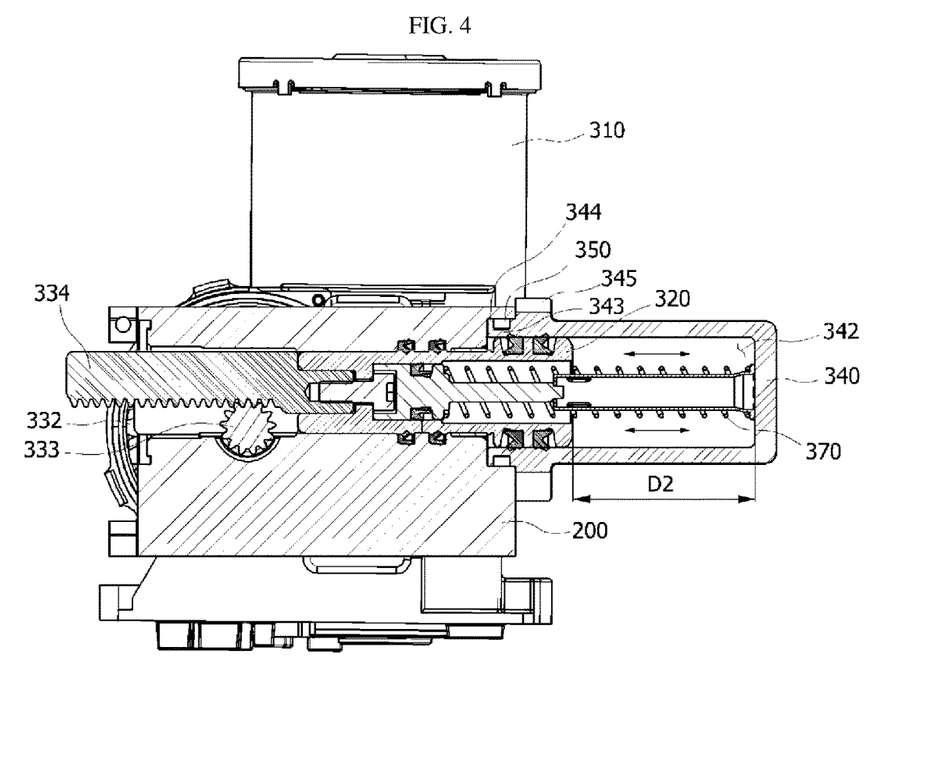
FIG. 4 is a perspective view showing a brake apparatus having a detachable pump housing according to another embodiment of the present invention.
Figure 5:
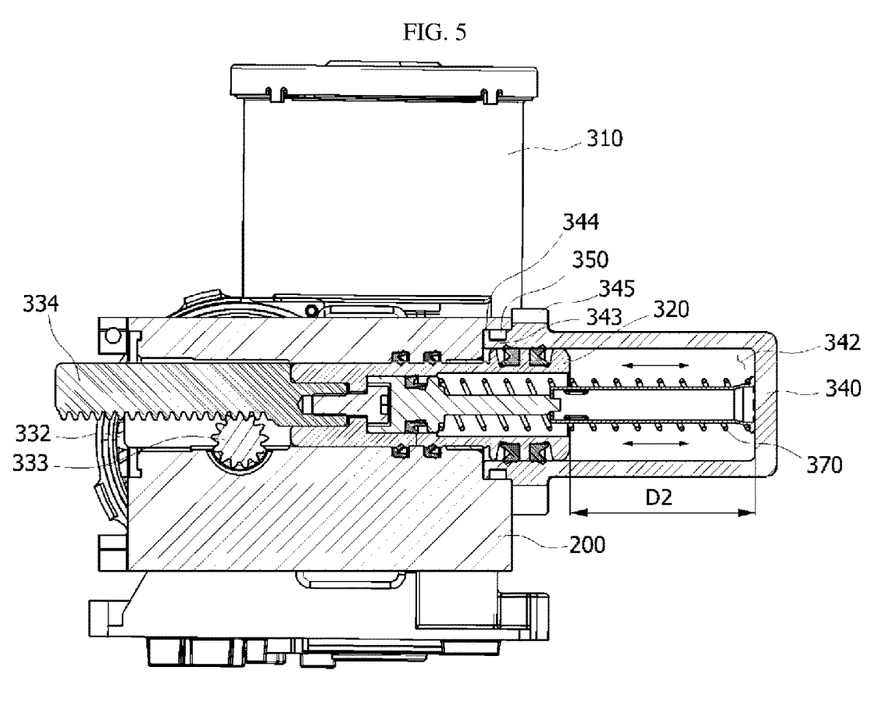
FIG. 5 is a cross-sectional view showing a brake apparatus having a detachable pump housing according to another embodiment of the present invention.

FIG. 4 is a perspective view showing a brake apparatus having a detachable pump housing according to another embodiment of the present invention, and FIG. 5 is a cross-sectional view showing a brake apparatus having a detachable pump housing according to another embodiment of the present invention.

When comparing FIGS. 1 and 4, it can be seen that the size of the main housing 200 is the same and only the size of the pump housing 340 is changed. That is, the size of the pump housing 340 in FIG. 4 is larger than that in FIG. 1.

In addition, when comparing FIGS. 3 and 5, it can be seen that the stroke of the pump piston 320 is changed even though the size of the main housing 200 is the same and only the size of the pump housing 340 is changed. That is, it can be seen that a stroke D2 of the pump piston 320 shown in FIG. 5 is longer than a stroke D1 of the pump piston 320 shown in FIG. 3.

When the main housing 200 and the pump housing 340 are formed to be detachable from each other as described above, the stroke of the pump piston 320 may be easily changed in accordance with a quantity of liquid of a pump required for each vehicle only by changing the size of the pump housing 340 to a different size. In addition, since only the pump housing 340 is replaced without changing the main housing 200, it is possible to manufacture the main housing 200 using a relatively small and inexpensive mold, to minimize the increase in weight and volume, and to minimize the workload required for machining.

Meanwhile, in the present embodiment, the master cylinder 110 and the pump piston 320 may be arranged on both sides in parallel with each other inside the main housing 200. In this manner, when the master cylinder 110 and the pump piston 320 are arranged in parallel with each other, space utilization may be facilitated compared with the case where the master cylinder 110 and the pump piston 320 are arranged alternately or perpendicularly. Accordingly, the size of the main housing 200 may be reduced, and further, the overall size of the brake apparatus may be reduced.

In the present embodiment, the motor 310 may be arranged outside the main housing 200, and the rotation shaft of the motor 310 and the pump piston 320 may be arranged perpendicular to each other.

In this manner, when the motor 310 is arranged perpendicular to the pump piston 320 outside the main housing 200, the motor 310 may be easily inspected and repaired, and efficient arrangement between the motor 310 and the pump piston 320 is achieved because the motor 310 and the pump piston 320 are not arranged in a straight line, so that the size of the main housing 200 may be reduced and the overall size of the brake apparatus may be also reduced.

Referring to FIGS. 2 and 3, the pump housing 340 includes an extension portion 343 which is inserted into the through-hole 210 of the main housing 200 along a periphery of the opening 341, and a gasket 350 for sealing may be provided between an inner surface of the through-hole 210 and an outer surface of the extension portion 343.

That is, the extension portion 343 of the pump housing 340 is inserted into the through-hole 210 of the main housing 200 in order to connect the pump housing 340 to the main housing 200.

In addition, when the gasket 350 made of an elastic material is inserted between the inner surface of the through-hole 210 and the outer surface of the extension portion 343 for the purpose of sealing therebetween and the pumping operation of the pump piston 320 is performed, it is possible to prevent a brake liquid received in the pump piston 320 from escaping between the pump housing 340 and the main housing 200.

Furthermore, a protrusion 344 extending outwardly perpendicularly to the extension portion 343 is formed at an end of the extension portion 343 along a periphery of the end of the extension portion 343, so that the gasket 350 fitted to an outer periphery of the extension portion 343 may be more stably supported.

In the present embodiment, the pump housing 340 defines a flange 345 protruding outwardly along a periphery at one side in which the opening 341 is formed, and the flange 345 may be fastened to the main housing 200 using bolts 360.

The flange 345 is supported while being in contact with the periphery of the through-hole 210 of the main housing 200, and the flange 345 of the pump housing 340 and the main housing 200 are fastened to each other using the bolts 360. As described above, when the flange 345 of the pump housing 340 and the main housing 200 are fastened to each other using the bolts 360, the main housing 200 and the pump housing 340 may be easily fixed and separated from each other.

Returning to FIG. 7, the gear unit 330 may include a worm shaft 331 that is coaxially connected to the rotation shaft of the motor 310, a worm wheel 332 that is engaged with the worm shaft 331 so as to intersect at a right angle with the worm shaft 331, a pinion gear 333 that is coaxially connected to the worm wheel 332, and a rack gear 334 that causes the pump piston 320 connected to an end of the pinion gear 333 to linearly move while linearly moving left and right along a rotation direction of the pinion gear 333 in engagement with the pinion gear 333.

Specifically, the worm wheel 332 is rotated by meshing with the worm shaft 331 connected to the rotation shaft of the motor 310, and as the worm wheel 332 is rotated, the pinion gear 333 having a concentric axis with the worm wheel 332 and being integrally coupled to the worm wheel 332 is rotated. Then, the rack gear 334 engaged with the pinion gear 333 linearly moves. One end of the rack gear 334 may be coupled to the pump piston 320, and the pump piston 320 inside the pump housing 340 may linearly move according to the linear movement of the rack gear 334 due to the rotation of the worm wheel 332.

In this manner, the linearly moving pump piston 320 may pressurize brake oil inside the pump housing 340 to discharge a hydraulic pressure to the master cylinder 110 or the hydraulic brake side.

Figure 6:
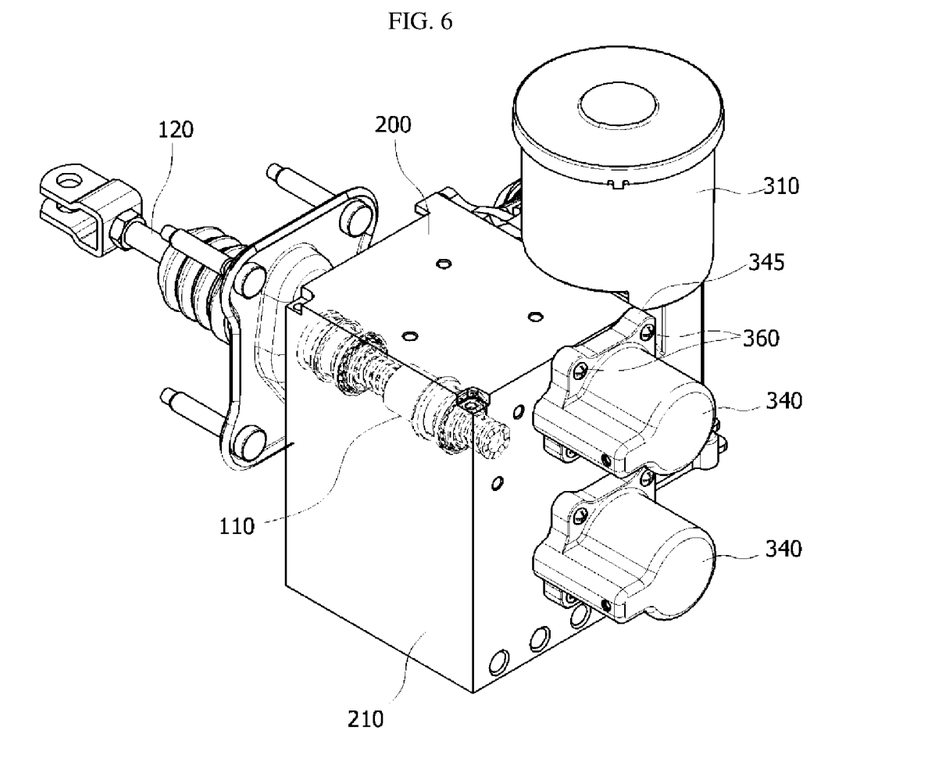
FIG. 6 is a perspective view showing a brake apparatus having a detachable pump housing according to still another embodiment of the present invention.

FIG. 6 is a perspective view showing a brake apparatus having a detachable pump housing according to still another embodiment of the present invention.

In the present embodiment, a plurality of the pump pistons 320 may be formed, a plurality of through-holes 210 may be formed in the main housing 200 to allow each of the pump pistons 320 to move in and out of the main housing 200, and a plurality of pump housings 340 may be provided to be respectively fastened to the plurality of through-holes 210.

As described above, when the plurality of through-holes 210 are formed in the main housing 200 and the pump housing 340 is connected to each through-hole 210, a case in which two pump pistons 320 are connected to one motor 310 or three or more pump pistons 320 are connected to one motor may be applied to the brake system.

According to the present invention as described above, even if the pump piston 320 is arranged inside the main housing 200, the size of the main housing 200 does not need to be increased, and the stroke of the pump piston 320 may be easily changed in accordance with a required quantity of liquid required for each size of a vehicle. In addition, the pump housing 340 in which the pump piston 320 is accommodated may be formed to be exposed to the outside of the main housing 200, so that the pump housing 340 may be easily inspected and repaired and there is an advantageous effect on the vehicle mountability.

As described above, the brake apparatus having the detachable pump housing according to an embodiment of the present invention does not need to increase the size of the BAU housing even when the piston pump is arranged in the BAU housing, and can easily change the stroke of the pump piston in accordance with a required quantity of liquid required for each size of a vehicle.

In addition, the pump housing in which the piston pump is accommodated is formed to be exposed to the outside of the BAU housing, so that the pump housing may be easily inspected and repaired and there is an advantageous effect on the vehicle mountability.

Hereinabove, although the present invention has been described by specific matters such as detailed components, limited exemplary embodiments, and drawings, they have been provided only for assisting in the entire understanding of the present invention. Therefore, the present invention is not limited to the exemplary embodiments. Various modifications and changes may be generated by those skilled in the art to which the present invention pertains within the scope without departing from an essential characteristic of the present invention. The spirit of the present invention should not be defined only by the described exemplary embodiments, and it should be appreciated that claims to be described below and all technical spirits which are evenly or equivalently modified are included in the claims of the present invention.

What is claimed is:

1. A brake apparatus having a detachable pump housing comprising:
    a master cylinder that receives an operating force of a pedal;
    a main housing in which the master cylinder is accommodated and a through-hole is formed at one side thereof;
    a motor that provides a driving force;
    a pump piston that is accommodated in the main housing, and moves in and out of the main housing through the through-hole by receiving the driving force from the motor;
    a gear unit that converts the driving force of the motor into a linear motion and transmits the linear motion to the pump piston; and
    a pump housing in which the pump piston is accommodated and an opening is formed at one side thereof, and that is detachably fastened to the main housing such that the opening communicates with the through-hole.

2. The brake apparatus having a detachable pump housing of claim 1, wherein the master cylinder and the pump piston are arranged in parallel with each other inside the main housing.

3. The brake apparatus having a detachable pump housing of claim 1, wherein the motor is arranged outside the main housing, and a rotation shaft of the motor and the pump piston are arranged perpendicular to each other.

4. The brake apparatus having a detachable pump housing of claim 1, wherein the gear unit includes
    a worm shaft that is coaxially connected to a rotation shaft of the motor,
    a worm wheel that is engaged with the worm shaft so as to intersect at a right angle with the worm shaft,
    a pinion gear that is coaxially connected to the worm wheel, and
    a rack gear that causes the pump piston connected to an end of the pinion gear to linearly move while linearly moving left and right along a rotation direction of the pinion gear in engagement with the pinion gear.

5. The brake apparatus having a detachable pump housing of claim 1, wherein the pump housing includes
an extension portion that protrudes to be inserted into the through-hole of the main housing at the opening, and
a gasket for sealing that is provided between an inner surface of the through-hole and an outer surface of the extension portion.

6. The brake apparatus having a detachable pump housing of claim 1, wherein the pump housing defines a flange extending outwardly at the opening, and the flange is fastened to the main housing using a bolt.

7. The brake apparatus having a detachable pump housing of claim 1, wherein a plurality of pump pistons are formed, a plurality of through-holes are formed in the main housing to allow each of the pump pistons to move in and out of the main housing, and a plurality of pump housings are provided to be respectively fastened to the plurality of through-holes.

* * * * *